US012090450B2

(12) United States Patent
Xie et al.

(10) Patent No.: US 12,090,450 B2
(45) Date of Patent: Sep. 17, 2024

(54) MICROBUBBLE GENERATION CONTAINER AND WATER DISCHARGING DEVICE

(71) Applicant: Purity (Xiamen) Sanitary Ware Co., LTD, Xiamen (CN)

(72) Inventors: Pawel Xie, Xiamen (CN); Mingqiang Yan, Xiamen (CN)

(73) Assignee: Purity (Xiamen) Sanitary Ware Co., LTD, Xiamen (CN)

( * ) Notice: Subject to any disclaimer, the term of this patent is extended or adjusted under 35 U.S.C. 154(b) by 0 days.

(21) Appl. No.: 17/993,900

(22) Filed: Nov. 24, 2022

(65) Prior Publication Data

US 2023/0086974 A1 Mar. 23, 2023

(30) Foreign Application Priority Data

Sep. 27, 2022 (CN) .......................... 202222564998.0

(51) Int. Cl.
*B01F 23/23* (2022.01)
*B01F 23/234* (2022.01)
(Continued)

(52) U.S. Cl.
CPC .... *B01F 23/23413* (2022.01); *B01F 23/2373* (2022.01); *B01F 23/237611* (2022.01); *B01F 35/7179* (2022.01); *B01F 23/236* (2022.01); *B01F 2101/305* (2022.01); *B01F 2101/48* (2022.01); *B67D 1/12* (2013.01);
(Continued)

(58) Field of Classification Search
CPC ............ B01F 23/23413; B01F 23/2373; B01F 23/237611; B01F 35/7179; B01F 23/236; B01F 2101/305; B01F 2101/48; B67D 1/12; E03C 1/02; E03C 1/021; E03C 1/023;
(Continued)

(56) References Cited

U.S. PATENT DOCUMENTS 2,584,418 A * 2/1952 Branson ............... G05D 7/0133
137/504
3,143,299 A * 8/1964 Benjamin ............... E03C 1/084
239/590.3
(Continued)

FOREIGN PATENT DOCUMENTS

CN 204233413 U * 4/2015 ............... A47K 3/28
CN 106925147 A * 7/2017 ........... B01F 3/04099
(Continued)

*Primary Examiner* — Stephen Hobson
(74) *Attorney, Agent, or Firm* — Zhigang Ma

(57) ABSTRACT

The present disclosure provides a microbubble generation container and a water discharging device. The container includes a barrel main body, an excitation member and an elastic member. The barrel main body is provided with a water inlet, a water outlet and a connecting port. The excitation member is movably arranged in the barrel main body, and includes a partition plate and a sealing portion. The partition plate divides an inner space of the barrel main body into a first chamber and a second chamber, and a water passage for communicating the first chamber with the second chamber is arranged on the partition plate. The water passage enables water flowing by to form water droplets and be ejected. The sealing portion opens and closes the connecting port with a motion of the excitation member.

13 Claims, 12 Drawing Sheets

(51) Int. Cl.
  *B01F 23/237* (2022.01)
  *B01F 23/2373* (2022.01)
  *B01F 35/71* (2022.01)
  *B01F 23/236* (2022.01)
  *B01F 101/00* (2022.01)
  *B01F 101/48* (2022.01)
  *B67D 1/12* (2006.01)
  *E03C 1/02* (2006.01)
  *E03C 1/084* (2006.01)
  *E03C 1/086* (2006.01)
  *E03C 1/10* (2006.01)
  *F16K 11/00* (2006.01)

(52) U.S. Cl.
  CPC ............. *E03C 1/02* (2013.01); *E03C 1/021* (2013.01); *E03C 1/023* (2013.01); *E03C 1/084* (2013.01); *E03C 1/086* (2013.01); *E03C 1/108* (2013.01); *F16K 19/006* (2013.01)

(58) Field of Classification Search
  CPC .......... E03C 1/084; E03C 1/086; E03C 1/108; F16K 19/006
  See application file for complete search history.

(56) References Cited

U.S. PATENT DOCUMENTS

| | | | | |
|---|---|---|---|---|
| 3,334,818 A * | 8/1967 | Moen | ............. | B05B 7/0425 239/431 |
| 3,524,591 A * | 8/1970 | Samuels | ............. | E03C 1/084 239/428.5 |
| 4,313,564 A * | 2/1982 | Shames | ............. | E03C 1/084 239/110 |
| 4,932,435 A * | 6/1990 | Stroze | ............. | F16K 17/28 137/614.16 |
| 5,071,071 A * | 12/1991 | Chao | ............. | E03C 1/084 239/533.1 |
| 5,279,329 A * | 1/1994 | Pippel | ............. | E03C 1/023 137/625.29 |
| 5,348,231 A * | 9/1994 | Arnold | ............. | E03C 1/084 239/447 |
| 5,634,491 A * | 6/1997 | Benedict | ............. | E03C 1/08 239/533.13 |
| 5,971,299 A * | 10/1999 | Loschelder | ............. | B05B 1/1618 239/DIG. 19 |
| 6,129,112 A * | 10/2000 | Huthmann | ............. | G05D 7/0133 251/118 |
| 7,017,837 B2 * | 3/2006 | Taketomi | ............. | E03C 1/084 239/443 |
| 7,252,248 B2 * | 8/2007 | Cutler | ............. | E03C 1/084 239/443 |
| 7,374,366 B2 * | 5/2008 | Tasi | ............. | E03C 1/084 4/491 |
| 7,503,341 B1 * | 3/2009 | Achterman | ............. | F16K 17/30 137/498 |
| 7,581,685 B2 * | 9/2009 | Belisle | ............. | B05B 1/1609 239/443 |
| 7,644,726 B1 * | 1/2010 | Achterman | ............. | F16K 17/30 137/516.25 |
| 7,681,598 B2 * | 3/2010 | Knapp | ............. | G05D 7/0133 137/513.3 |
| 8,485,220 B2 * | 7/2013 | Riano Gutierrez | .. | G05D 7/0133 137/513.3 |
| 9,068,329 B2 * | 6/2015 | Gransow | ............. | E03C 1/084 |
| 9,205,436 B2 * | 12/2015 | Zhou | ............. | B05B 1/1636 |
| 9,447,567 B2 * | 9/2016 | Huang | ............. | E03C 1/084 |
| 9,481,986 B2 * | 11/2016 | Zoller | ............. | E03C 1/084 |
| 9,587,758 B2 * | 3/2017 | Bereznai | ............. | F16F 9/34 |
| 10,060,540 B2 * | 8/2018 | Cutler | ............. | F16K 11/044 |
| 10,310,519 B2 * | 6/2019 | Medina | ............. | G05D 7/014 |
| 10,640,957 B2 * | 5/2020 | Birmelin | ............. | B05B 7/0425 |
| 10,677,370 B2 * | 6/2020 | Liang | ............. | F24H 15/31 |
| 10,697,162 B2 * | 6/2020 | Li | ............. | B05B 1/18 |
| 11,085,177 B2 * | 8/2021 | Schurle | ............. | B05B 12/002 |
| 11,408,159 B2 * | 8/2022 | Wu | ............. | E03C 1/086 |
| 2002/0189679 A1 * | 12/2002 | Avis | ............. | G05D 7/0133 137/462 |
| 2003/0141480 A1 * | 7/2003 | Green | ............. | F16K 27/067 251/315.01 |
| 2006/0011748 A1 * | 1/2006 | Ferrari | ............. | E03C 1/08 239/398 |
| 2007/0196177 A1 * | 8/2007 | Tasi | ............. | E03C 1/084 405/79 |
| 2008/0251604 A1 * | 10/2008 | Schmid | ............. | E03C 1/084 239/113 |
| 2009/0020628 A1 * | 1/2009 | Belisle | ............. | B05B 1/1609 239/428.5 |
| 2009/0166450 A1 * | 7/2009 | Kao | ............. | E03C 1/084 239/428.5 |
| 2011/0017322 A1 * | 1/2011 | Zoller | ............. | G05D 7/012 137/503 |
| 2011/0155252 A1 * | 6/2011 | Li | ............. | G05D 7/0133 137/41 |
| 2011/0284104 A1 * | 11/2011 | Riano Gutierrez | .. | G05D 7/0133 137/517 |
| 2012/0061492 A1 * | 3/2012 | Peng | ............. | E03C 1/084 239/548 |
| 2012/0318385 A1 * | 12/2012 | Lian | ............. | B05B 1/18 137/517 |
| 2013/0049235 A1 * | 2/2013 | Lin | ............. | E03C 1/084 261/114.1 |
| 2013/0134235 A1 * | 5/2013 | Blum | ............. | B05B 1/3402 239/428.5 |
| 2013/0168579 A1 * | 7/2013 | Lin | ............. | F16K 17/28 251/12 |
| 2014/0217203 A1 * | 8/2014 | Zoller | ............. | E03C 1/084 239/428.5 |
| 2014/0300010 A1 * | 10/2014 | Zhou | ............. | E03C 1/084 261/78.2 |
| 2014/0338767 A1 | 11/2014 | Chen | | |
| 2015/0040990 A1 * | 2/2015 | Mathiesen | ......... | F16K 31/1221 137/12 |
| 2015/0167849 A1 | 6/2015 | Yang | | |
| 2017/0022693 A1 * | 1/2017 | Wu | ............. | F16K 7/07 |
| 2017/0252755 A1 * | 9/2017 | Pitsch | ............. | B05B 1/169 |
| 2017/0315565 A1 * | 11/2017 | Medina | ............. | G05D 7/014 |
| 2018/0045329 A1 | 2/2018 | Yang | | |
| 2018/0258621 A1 * | 9/2018 | Binay Kumar | ....... | E03C 1/0403 |
| 2018/0296991 A1 * | 10/2018 | Park | ............. | B01F 23/2341 |
| 2019/0270630 A1 * | 9/2019 | Dahan | ............. | E03C 1/057 |
| 2019/0301069 A1 * | 10/2019 | Hwang | ............. | B01F 25/4334 |
| 2019/0301070 A1 * | 10/2019 | Hwang | ............. | D06F 35/002 |
| 2019/0329193 A1 * | 10/2019 | Sasaki | ............. | D06F 39/088 |
| 2019/0373828 A1 * | 12/2019 | Elkington | ............. | A01G 31/00 |
| 2020/0030825 A1 * | 1/2020 | Otoguro | ............. | B01F 25/431 |
| 2020/0131747 A1 * | 4/2020 | Wu | ............. | E03C 1/086 |
| 2020/0179959 A1 * | 6/2020 | Vaucher | ............. | B05B 1/3421 |
| 2020/0246763 A1 * | 8/2020 | Uchiyama | ............. | B01F 25/25 |
| 2020/0318329 A1 * | 10/2020 | Tempel | ............. | E03C 1/08 |
| 2020/0325999 A1 * | 10/2020 | Aklog | ............. | G05D 7/0133 |
| 2021/0108398 A1 * | 4/2021 | Dan | ............. | B05B 3/026 |
| 2021/0140550 A1 * | 5/2021 | Spataro | ............. | F16K 17/34 |
| 2021/0148100 A1 * | 5/2021 | Zhou | ............. | E03C 1/0405 |
| 2021/0172159 A1 * | 6/2021 | Zhou | ............. | E03C 1/08 |
| 2021/0222410 A1 * | 7/2021 | Wu | ............. | B05B 1/262 |
| 2022/0127829 A1 * | 4/2022 | Xie | ............. | E03C 1/0404 |
| 2022/0410190 A1 * | 12/2022 | Xie | ............. | B05B 1/185 |
| 2022/0412062 A1 * | 12/2022 | Xie | ............. | E03C 1/0408 |
| 2023/0086974 A1 * | 3/2023 | Xie | ............. | B01F 23/2373 261/115 |
| 2023/0233730 A1 * | 7/2023 | Shimada | ............. | B01D 53/85 422/5 |

FOREIGN PATENT DOCUMENTS

| | | | | |
|---|---|---|---|---|
| CN | 109058541 A | * | 12/2018 | ............. F16K 17/34 |
| CN | 111074977 A | * | 4/2020 | ......... E03C 1/0405 |
| DE | 102013001479 A1 | * | 7/2014 | ........... G05D 7/012 |
| WO | WO-2005115596 A1 | * | 12/2005 | ............ B01F 23/232 |

(56) References Cited

FOREIGN PATENT DOCUMENTS

| | | | | |
|---|---|---|---|---|
| WO | WO-2006125270 A1 * | 11/2006 | ............... | E03C 1/08 |
| WO | WO-2013011570 A1 * | 1/2013 | .......... | B01F 3/04503 |
| WO | WO-2015165464 A1 * | 11/2015 | ........... | G05D 7/0106 |
| WO | WO-2021065237 A1 * | 4/2021 | ............... | A47K 3/28 |

* cited by examiner

MICROBUBBLE GENERATION CONTAINER AND WATER DISCHARGING DEVICE

TECHNICAL FIELD

The present disclosure relates to the technical field of microbubbles, in particular, to a microbubble generation container and a water discharging device.

BACKGROUND

With the improvement of people's living standards, people put forward higher and higher requirements for domestic water, such as bath water and cleaning water for fruits, vegetables and tableware. It is not only required that domestic water should be pollution-free, but also required that the domestic water can have a bactericidal activity, as well as good water quality. For this reason, people have developed microbubble generation containers, which can make water mixed with air and other gases to form microbubble water. When water contains microbubbles, the water can achieve a bactericidal effect, and the water use experience of a user can be improved.

In relevant technologies, when air in the microbubble generation container is used up, that is, after the container is filled with water, it is necessary to press a press end of a drain valve to open a drain port at a bottom of the container to discharge the water in the container. At the same time, a press end of a press valve is connected to a sealing member through a linkage rod, so that when the drain valve is pressed, the linkage sealing member moves far away from an air inlet, so that external gas can enter the container through the air inlet. However, due to its complex structure, the container cannot be repeatedly used before the press end of the drain valve is pressed, resulting in limitations to an application scenario.

SUMMARY

The present disclosure aims to provide a microbubble generation container with a simplified structure, and a water discharging device.

In order to solve the above-mentioned technical problems, the present disclosure adopts the following technical solution:

According to one aspect of the present disclosure, the present disclosure provides a microbubble generation container. The microbubble generation container includes a barrel main body, an exciter and an elastic body. The barrel main body is provided with a water inlet, a water outlet, a guide hole and a connecting port. The exciter is movably arranged in the barrel main body, and includes a partition plate, a guide rod, and an annular sealing rib. The partition plate is configured to divide an inner space of the barrel main body into a first chamber and a second chamber, where the water inlet is communicated to the first chamber, the water outlet and the connecting port are both communicated to the second chamber. The partition plate is provided with a water passage for communicating the first chamber with the second chamber, where the water passage enables water flowing by to form water droplets and be ejected. The guide rod extends from a surface, facing the connecting port and the guide hole, of the partition plate, where one end of the guide rod is movably arranged in the guide hole. The sealing rib is protruded from a sidewall of the guide rod, where the sealing rib is configured to open and close the connecting port with a motion of the guide rode. The elastic body is configured to act on the exciter to drive the exciter to move towards the water inlet, so as to remove the sealing rib from the connecting port to open the connecting port. The exciter is driven to move towards the connecting port under an impact force of water entering the first chamber from the water inlet on the partition plate when the impact force overcomes an elastic force of the elastic body, so as to make the sealing rib be able to close the connecting port.

According to some embodiments of the present disclosure, the guide rod is movably arranged in the guide hole in a penetrating manner.

According to some embodiments of the present disclosure, the sealing rib is configured to cooperate with the guide rod to close the connecting port.

According to some embodiments of the present disclosure, the barrel main body further includes a connecting pipe section and a supporting plate. One end of the connecting pipe section is communicated with the second chamber, and the connecting port is formed in the one end of the connecting pipe section. An other end of the connecting pipe section is communicated to the outside of the barrel main body. The supporting plate is connected to the inside of the connecting pipe section and is away from the connecting port. The supporting plate is provided with the guide hole and a plurality of through holes, where the sealing rib is configured to move into the connecting pipe section to close the connecting port, or move out of the connecting pipe section to open the connecting port.

According to some embodiments of the present disclosure, the exciter further includes a sealing ring annularly arranged on an outer circumferential wall of the sealing rib; wherein when the sealing rib moves into the connecting pipe section to close the connecting port, the sealing ring is located between the outer circumferential wall of the sealing rib and the inner circumferential wall of the connecting pipe section to improve the sealing performance.

According to some embodiments of the present disclosure, one end of the connecting pipe section communicated to the barrel main body extends into the barrel main body, to make a height difference between the connecting port and the water outlet.

According to some embodiments of the present disclosure, the elastic body is a spring; and the spring sleeves the guide rod and is located between the supporting plate and the sealing rib.

According to some embodiments of the present disclosure, a flow rate of the water inlet is greater than that of the water passage.

According to some embodiments of the present disclosure, a limiting rib is arranged on one end, close to the water inlet, of an inner circumferential wall of the barrel main body; and the limiting rib is configured to limit the partition plate to move between an end surface of the barrel main body and the limiting rib.

According to some embodiments of the present disclosure, the water passage includes a first passage, a second passage, and a third passage which are communicated in sequence; a plurality of first passages are arranged around the second passage; a flowing cross-sectional area from one end of the second passage communicated to the first passage to one end communicated to the third passage gradually decreases; and a flowing cross-sectional area from one end of the third passage communicated to the second passage to one end away from the second passage gradually increases.

According to some embodiments of the present disclosure, the first passages are slantways arranged.

According to some embodiments of the present disclosure, the microbubble generation container further includes a dissolved air release body arranged in the barrel main body and located at the water outlet; wherein the dissolved air release body is internally provided with a plurality of flow guide passages that are configured for releasing air dissolved in water flowing out of the water outlet, so as to generate microbubble water with extremely small bubbles from the water flowing out of the water outlet.

According to some embodiments of the present disclosure, each flow guide passage includes a pressurization section, a throat section, and a pressure relief section which are communicated in turn, wherein a flowing cross-sectional area from a water inlet end to a water outlet end of the pressurization section gradually decreases, a flowing cross-sectional area from a water inlet end to a water outlet end of the throat section is roughly equal, a flowing cross-sectional area from a water inlet end to a water outlet end of the pressure relief section gradually increases; the water inlet end of the pressurization section is configured to receive the water flowing out of the water outlet.

According to another aspect of the present disclosure, a water discharging device includes the microbubble generation container according to any one of the above embodiments, and further includes a dissolved air release body and a water utilization terminal; the dissolved air release body is used for generating microbubble water from water flowing out of the water outlet, so that the water utilization terminal uses the microbubble water; and a water intake of the water inlet is greater than a water discharge of the water utilization terminal.

According to the above technical solutions, the present disclosure has the following advantages and beneficial effects:

In the microbubble generation container of the embodiments of the present disclosure, when water enters the first chamber from the water inlet, an impact force of the water on the partition plate can drive the exciter to overcome an elastic force of the elastic body to move, so that the sealing rib closes the connecting port. When the water passes through the water passage, water droplets are formed and enter the second chamber. Due to the formation of the water droplets, a contact area between the water and air in the second chamber can be enlarged, thus improving the air dissolution efficiency. After water and air are mixed, the mixture outwards flows to the water utilization terminal for use through the water outlet.

When water supplying is stopped at the water inlet, the elastic body acts on the exciter, so that the exciter automatically reversely moves to open the connecting port, and the water in the barrel main body can outwards flow through the connecting port. Meanwhile, external air can also enter the barrel main body through the connecting port to fully fill the barrel main body again, so that there is enough air dissolved in the water during next use. According to the container, the impact force of the water flow and the elastic force of the elastic body are ingeniously used, thus automatically opening and closing the connecting port. The structure of the microbubble generation container is simplified, and the microbubble generation container can adapt to more application scenarios.

Figure 1:
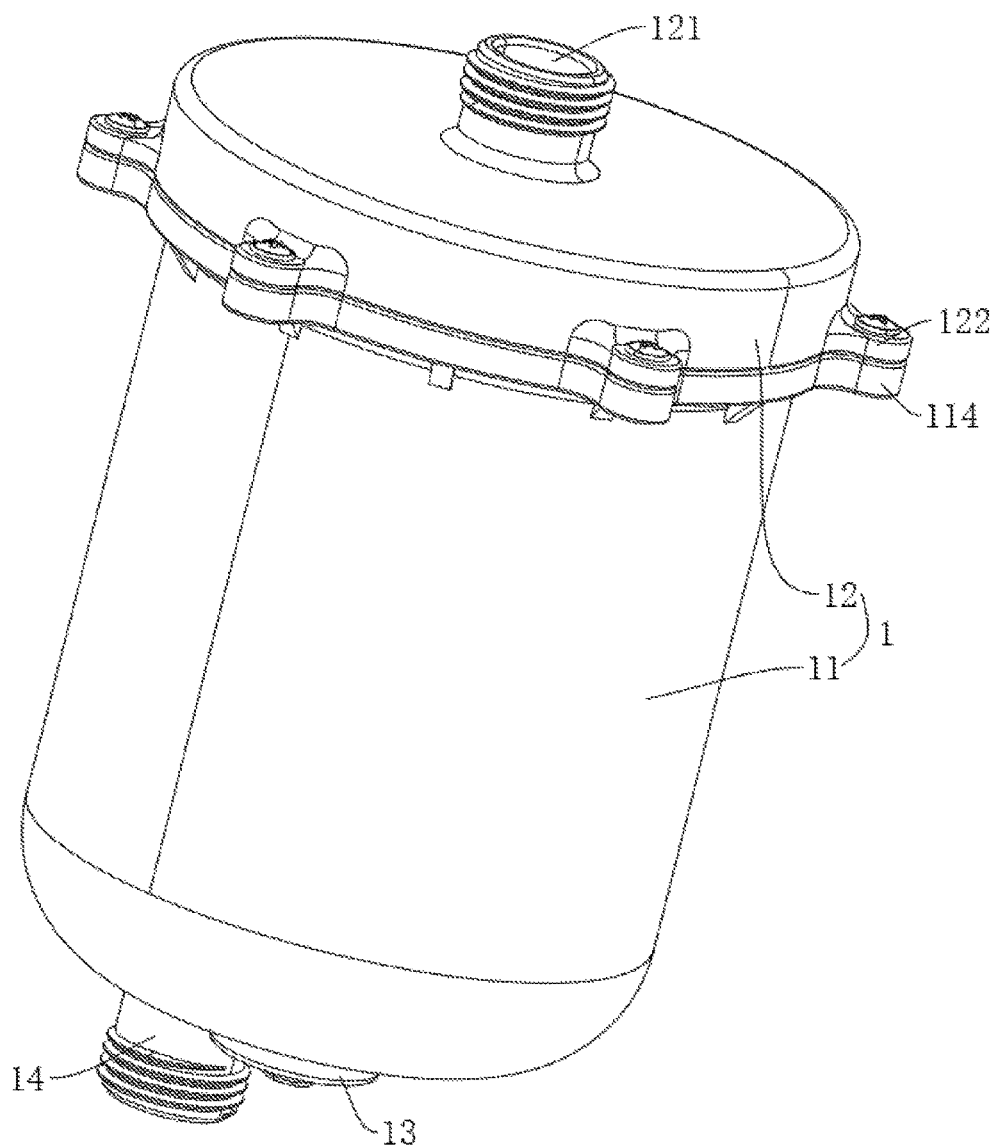
FIG. 1 is a schematic structural diagram of a microbubble generation container according to one embodiment of the present disclosure.

Numerals in the drawings: 1: barrel main body; 11: barrel body; 111: water outlet; 112: connecting port; 113: connection ring; 114: first lug portion; 115: first reinforcing rib; 12: barrel cover; 121: water inlet; 122: second lug portion; 13: connecting pipe section; 14: water outlet pipe section; 15: supporting plate; 151: guide hole; 152: through hole; 16: first chamber; 17: second chamber; 2: exciter; 21: partition plate; 211: second reinforcing rib; 212: water passage; 2121: first passage; 2122: second passage: 2123: third passage: 22: sealing rib; 23: connecting member; 24: guide rod; 3: elastic body; 41: first sealing ring; 42: second sealing ring; 43: third sealing ring; 5: dissolved air release body; 51: flow guide passage; 511: pressurization section; 512: throat section; and 513: pressure relief section.

DETAILED DESCRIPTION OF THE EMBODIMENTS

Although the present disclosure can easily be represented as embodiments in different forms, only some of the specific embodiments are shown in the drawings and will be described in detail in this specification. Meanwhile, it can be understood that this specification should be regarded as an exemplary description of the principle of the present disclosure, rather than being intended to limit the present disclosure to those described here.

Therefore, a feature indicated in this specification will be used to describe one of the features of one embodiment of the present disclosure, rather than implying that each embodiment of the present disclosure must have the described feature. In addition, it should be noted that this specification describes many features. Although some features can be combined to show a possible system design, these features can also be used for other unspecified combinations. Thus, unless otherwise stated, the stated combinations are not intended to limit the present disclosure.

In the embodiments shown in the accompanying drawings, direction indications (such as up, down, left, right, front and back) are used to explain that the structures and movements of various elements of the present disclosure are not absolute but relative. When these elements are in the positions shown in the drawings, these descriptions are appropriate. If the descriptions of the positions of these elements change, the indications of these directions change accordingly.

The preferred embodiments of the present disclosure are further described in detail below in combination with the drawings of this specification.

Referring to FIG. 1 to FIG. 5, a microbubble generation container provided in an embodiment of the present disclosure includes a barrel main body 1, an exciter 2, and an elastic body 3.

The barrel main body 1 extends vertically and is internally hollow, an inner space of which provides a mounting space for the exciter 2 and the elastic body 3, and serves as a space for containing water and/or air.

A top of the barrel main body 1 is provided with a water inlet 121 which is communicated to an external water source, so that water can enter the inner space of the barrel main body 1 from the water inlet 121. A bottom of the barrel main body 1 is provided with a water outlet 111 and a connecting port 112, and the water outlet 111 is communicated to a water utilization terminal, so as to supply water to the water utilization terminal. The connecting port 112 connects the inner space of the barrel main body 1 to the outside, so that the water in the barrel main body 1 can be discharged to the outside, or external air can enter the inner space of the barrel main body 1 through the connecting port 112.

In some embodiments, the barrel main body 1 includes a barrel body 11 and a barrel cover 12. The barrel body 11 extends vertically and is internally hollow. The water outlet 111 and the connecting port 112 are arranged at a bottom of the barrel body 11, and a top of the barrel body 11 is provided with an opening. The barrel cover 12 is covered to the top of the barrel body 11 and closes the opening in the top of the barrel body 11. The water inlet 121 is arranged on the barrel cover 12. The barrel body 11 and the barrel cover 12 are detachably connected, so that the mounting of the microbubble generation container is completed by covering the barrel cover 12 to the top of the barrel body 11 after the exciter 2 and the elastic body 3 in the barrel body 11.

Figure 2:
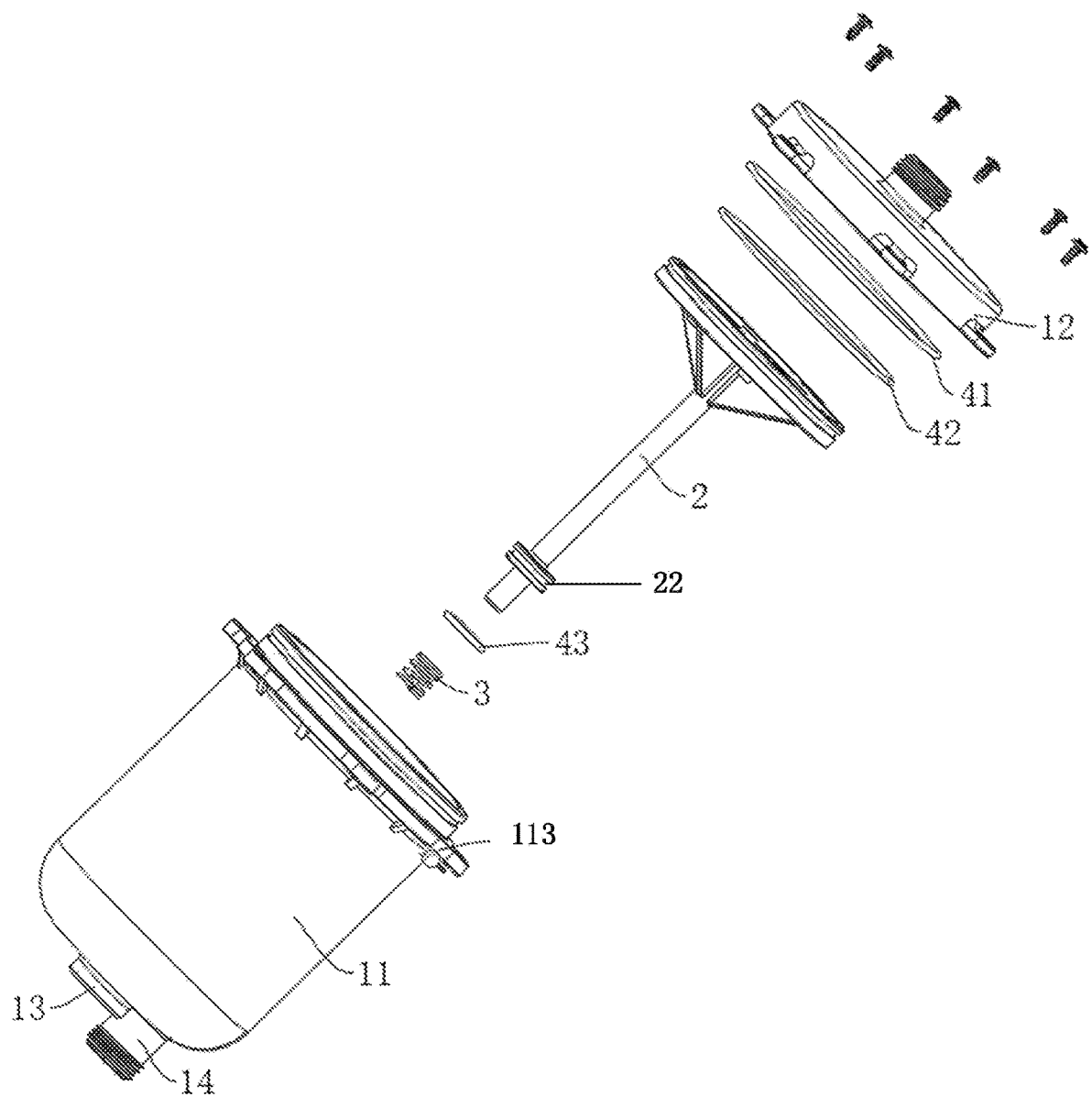
FIG. 2 is a schematic exploded structural diagram of FIG. 1.
Figure 3:
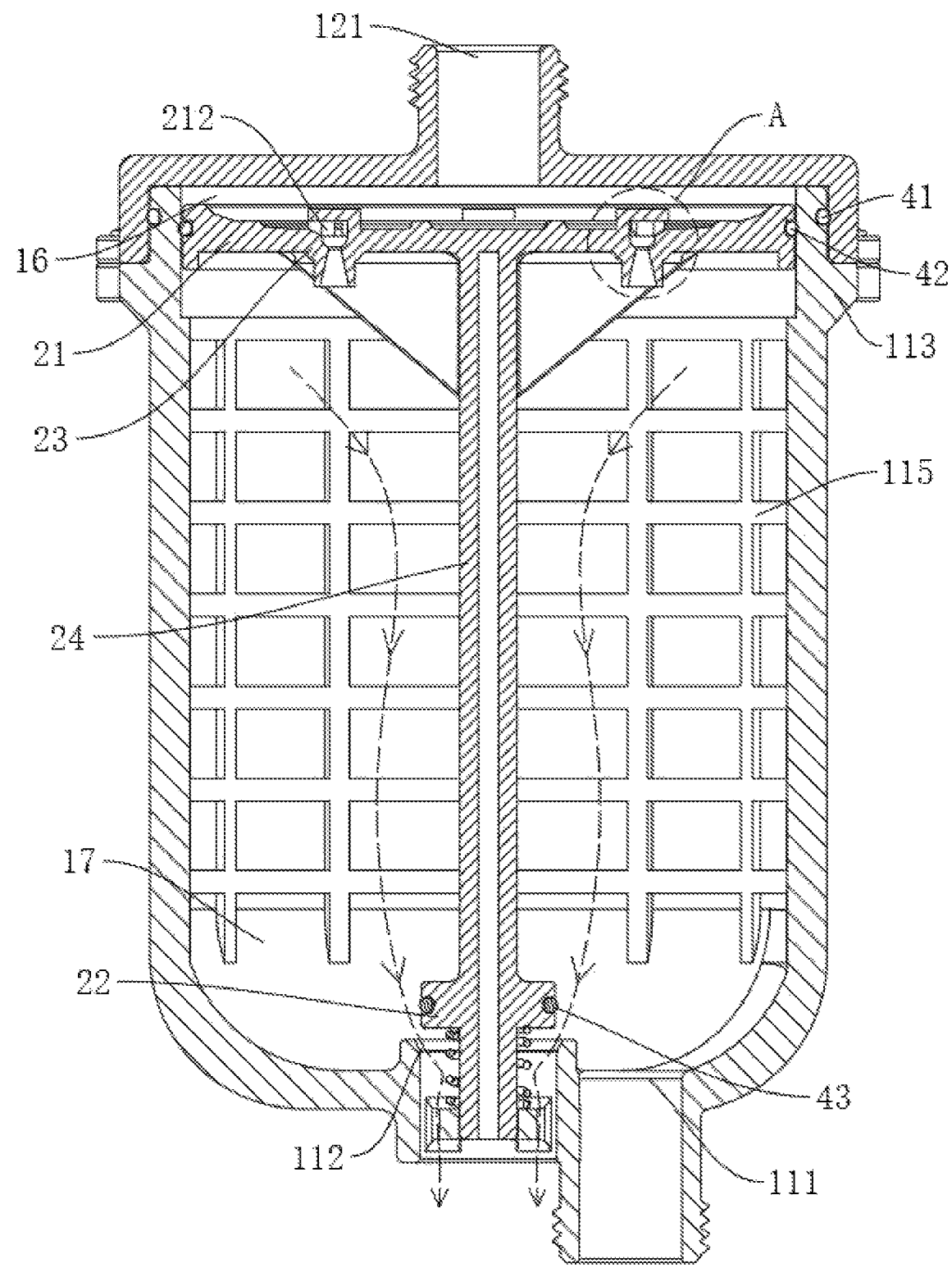
FIG. 3 is a sectional diagram of a connecting port in FIG. 1 in an opened state.
Figure 7:
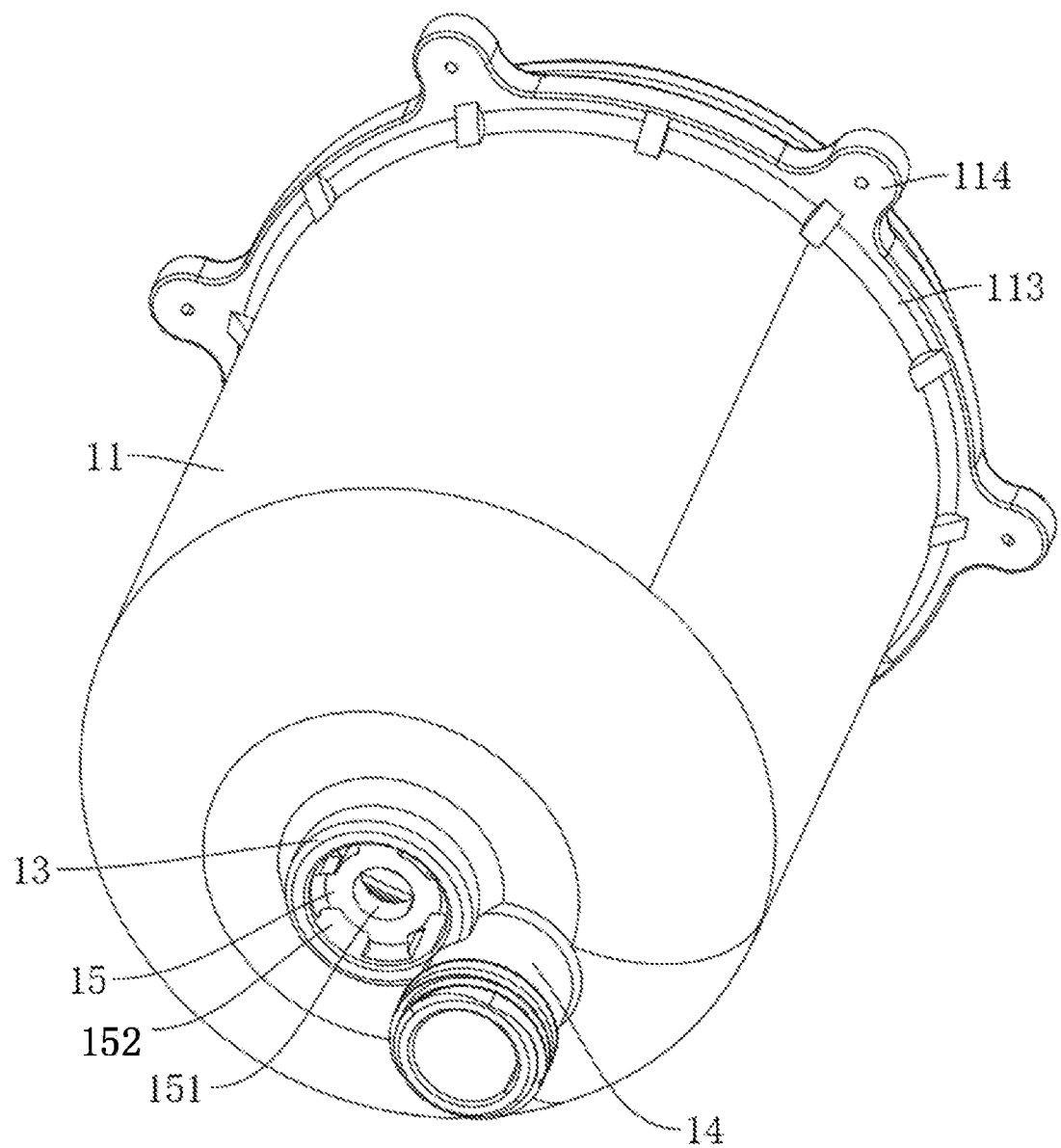
FIG. 7 is a schematic structural diagram of FIG. 6 in another angle.

Referring to FIG. 2 and FIG. 7, and in combination with FIG. 2 and FIG. 3, in some embodiments, a connection ring 113 is annularly arranged on an outer circumferential wall of the barrel body 11, and an inner diameter of the barrel cover 12 is greater than an outer diameter of the barrel body 11. When the barrel cover 12 is covered to the barrel body 11, the barrel cover can be abutted against the connection ring 113 to improve the sealing performance of the barrel main body 1.

In some embodiments, the outer circumferential wall of the barrel body 11 is sleeved with a first sealing ring 41, and the first sealing ring 41 is located between the outer circumferential wall of the barrel body 11 and an inner circumferential wall of the barrel cover 12 to further improve the sealing performance of the barrel main body 1.

Referring mainly to FIG. 1, in some embodiments, the outer circumferential wall of the connection ring 113 of the cylinder body 11 is annularly provided with a plurality of first lug portions 114, and the outer circumferential wall of the barrel cover 12 is provided with a plurality of second lug portions 122. The first lug portions 114 and the second lug portions 122 are based on one-to-one correspondence, and the barrel cover 12 and the barrel body 11 are detachably connected through a bolt. In other embodiments, the barrel cover 12 and the cylinder body 11 can also be connected by welding.

Figure 4:
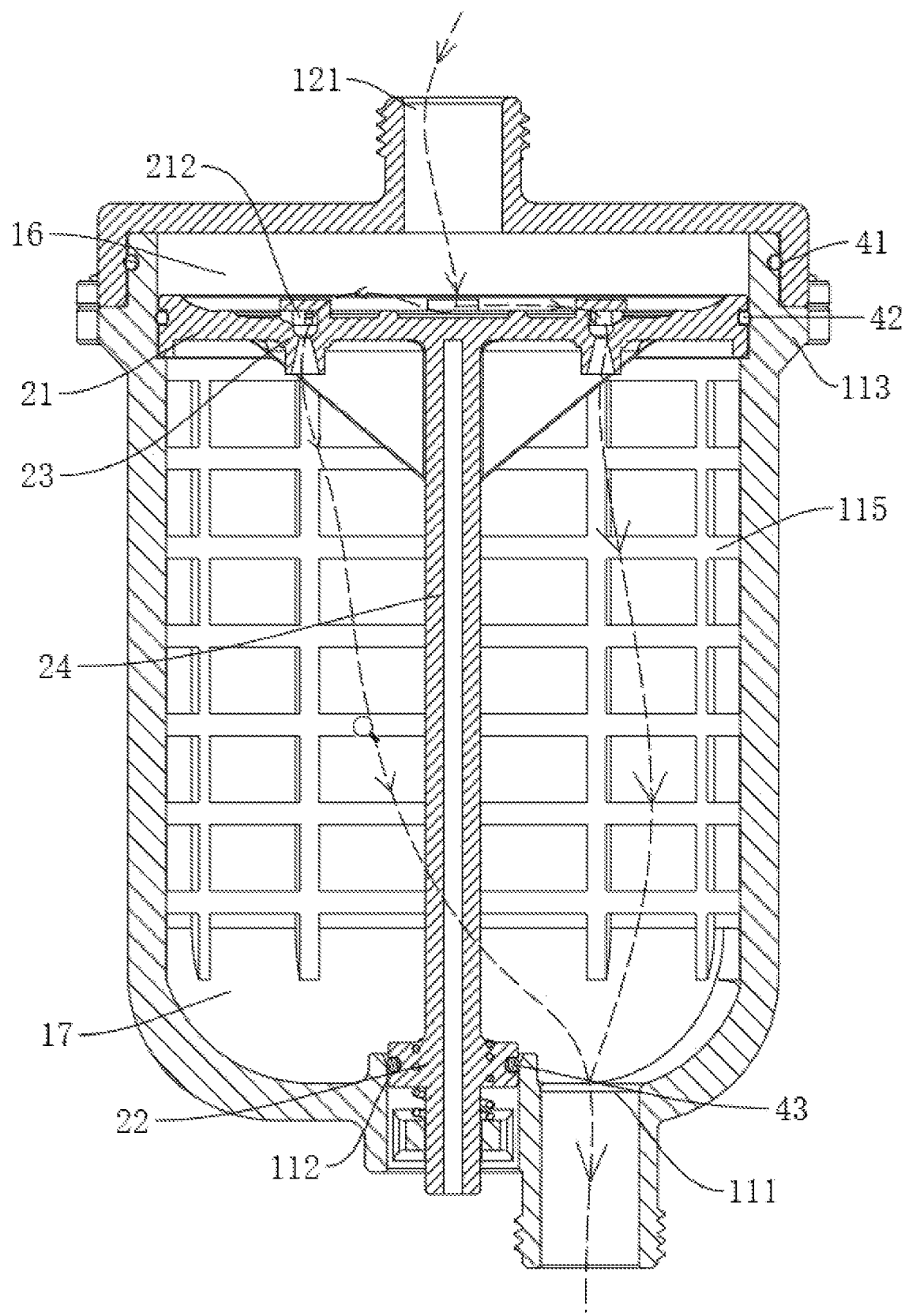
FIG. 4 is a sectional diagram of a connecting port in FIG. 1 in a closed state.
Figure 6:
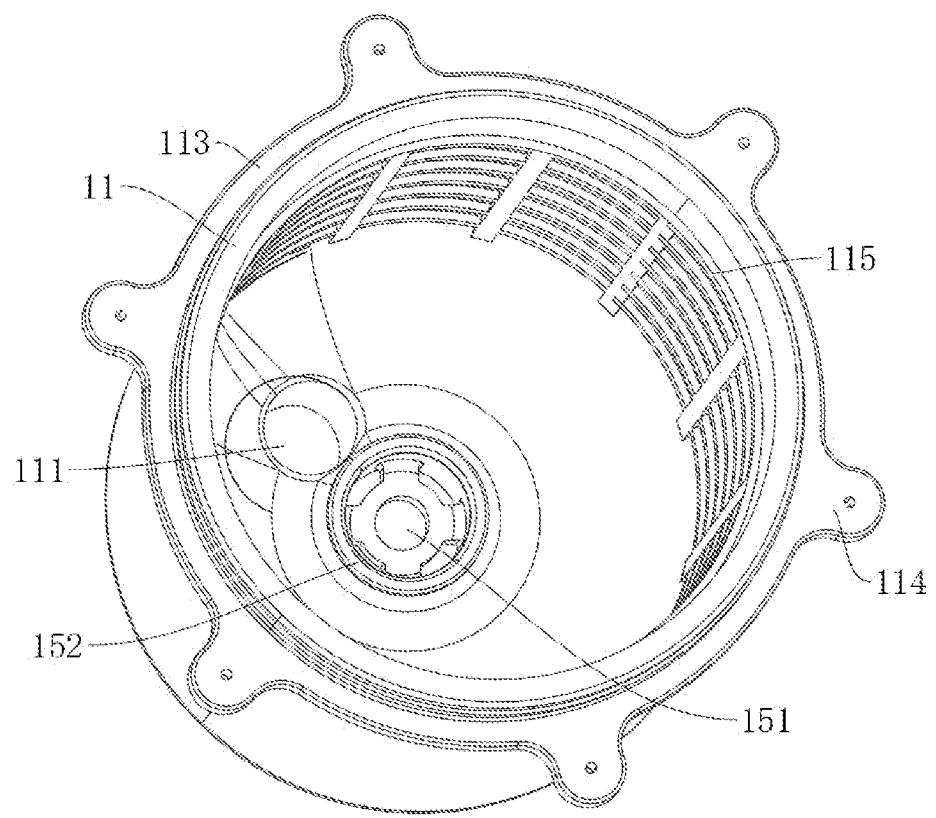
FIG. 6 is a schematic structural diagram of a barrel body in FIG. 1.

Referring to FIG. 6 and in combination with FIG. 3 and FIG. 4, in some embodiments, the inner circumferential wall of the barrel body 11 is provided with a plurality of first reinforcing ribs 115 which are arranged in a grid shape to improve the structural strength of the barrel body 11.

Referring to FIG. 7 and in combination with FIG. 3 and FIG. 4, in some embodiments, the barrel main body 1 also includes a connecting pipe section 13 and a water outlet pipe section 14. The connecting pipe section 13 extends vertically, and the connecting pipe section 13 is roughly coaxial with the barrel body 11. An upper end of the connecting pipe section 13 is communicated to the inner space of the barrel main body 1. An end opening of the upper end of the connecting pipe section is used as the connecting port 112, and a lower end of the connecting pipe section 13 is communicated to the outside of the barrel main body 1. The water outlet pipe section 14 extends vertically, and an upper end of the water outlet pipe section 14 is communicated to the inner space of the barrel main body 1. An end opening of the upper end of the water outlet pipe section is used as a water outlet 111, and a lower end of the water outlet pipe section 14 is communicated to the outside of the barrel main body 1 to the water utilization terminal.

In some embodiments, the upper end of the connecting pipe section 13 extends into the barrel body 11, which makes a height difference between the connecting port 112 and the water outlet 111. Therefore, when a small amount of water enters the barrel body 11, the water will only flow out from the water outlet 111, rather than the connecting port 112.

In some embodiments, the barrel main body 1 also includes a supporting plate 15. The supporting plate 15 is connected to the inside of the connecting pipe section 13 and away from the water outlet 111. A guide hole 151 is arranged on the supporting plate 15, and the supporting plate 15 is also provided with a through hole 152. The connecting port 112 connects the inner space of the barrel main body 1 to the outside through the through hole 152, so that the water in the barrel main body 1 can be discharged to the outside from the connecting port 112 and the through hole 152, or external air can enter the inner space of the barrel main body 1 through the through hole 152 and the connecting port 112. A plurality of through holes 152 can be arranged around the guide hole 151. By the arrangement of the plurality of through holes 152, the water discharge and the air intake can be increased.

Referring mainly to FIG. 3 and FIG. 4, the exciter 2 can be arranged in the barrel body 11 in a manner of moving up and down. The exciter 2 includes a partition plate 21 and a sealing rib 22. The partition plate 21 is horizontally arranged. The partition plate 21 divides the inner space of the barrel body 11 into a first chamber 16 located above the partition plate 21 and a second chamber 17 located below the partition plate 21. The water inlet 121 is communicated to the first chamber 16, and the water outlet 111 and the connecting port 112 are communicated to the second chamber 17.

Figure 8:
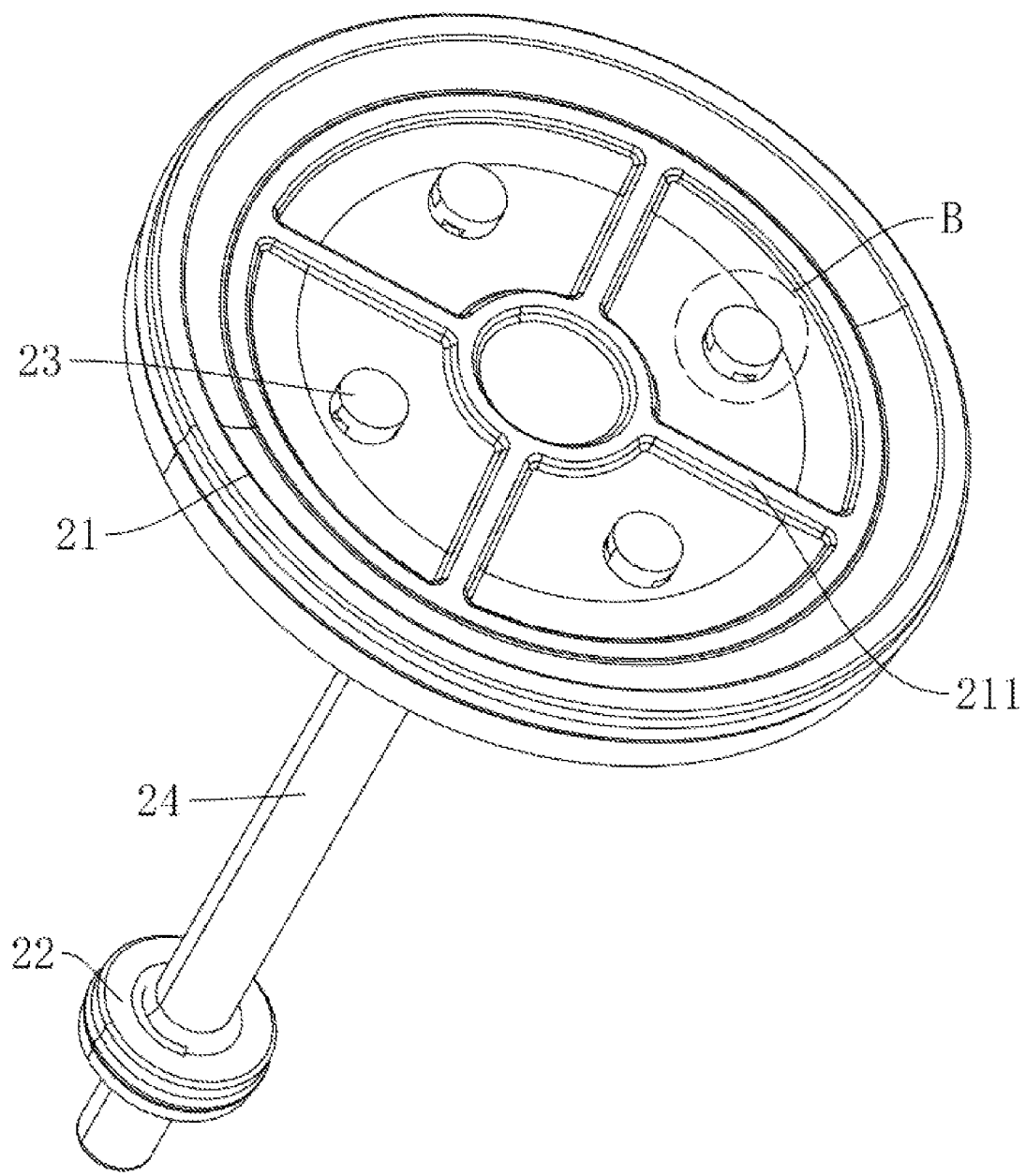
FIG. 8 is a schematic structural diagram of an exciter in FIG. 1.

Referring to FIG. 8, in some embodiments, a top surface of the partition plate 21 is provided with a second reinforcing rib 211. The second reinforcing rib 211 includes an annular reinforcing ring and a plurality of reinforcing bars annularly connected to the reinforcing ring radially. The structural strength of the partition plate 21 is improved through the second reinforcing rib 211.

The partition plate 21 is provided with a water passage 212 for connecting the first chamber 16 with the second chamber 17. The water passage 212 enables the water flowing by to form water droplets and be ejected, and the formed water droplets can enlarge a contact area between the water and the air, thereby improving the air dissolution efficiency. There may be a plurality of water passages 212 to improve the efficiency of producing water droplets.

Figure 9:
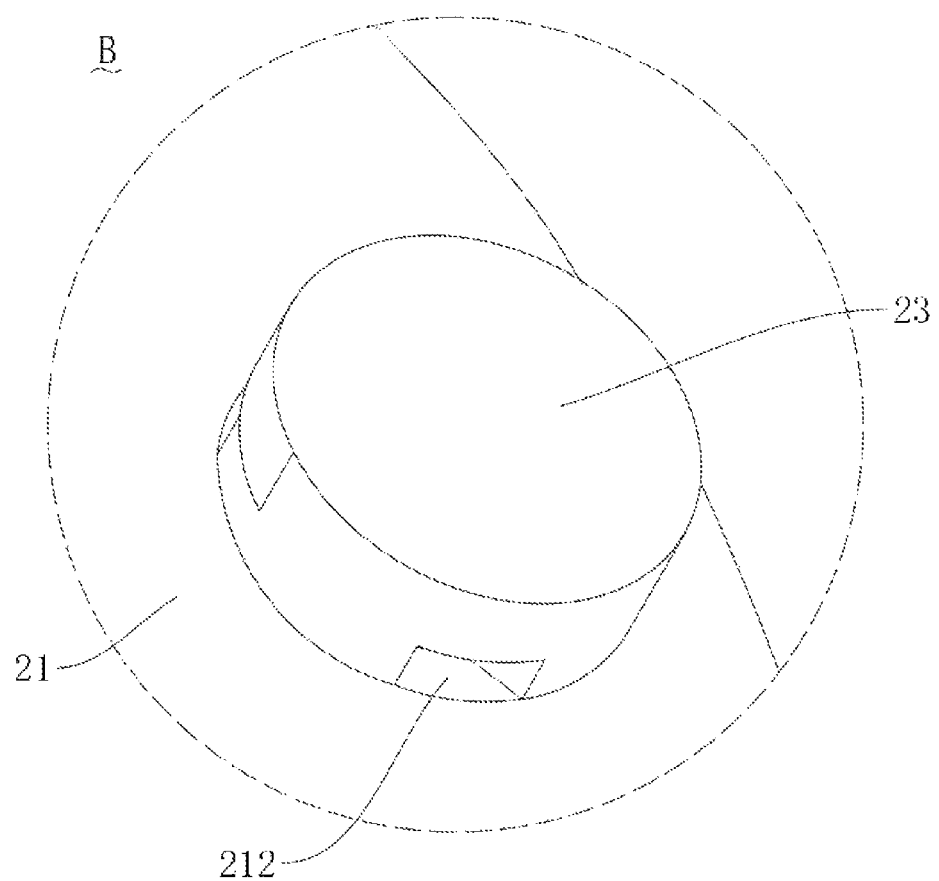
FIG. 9 is a schematic enlarged diagram of region B in FIG. 8.
Figure 10:
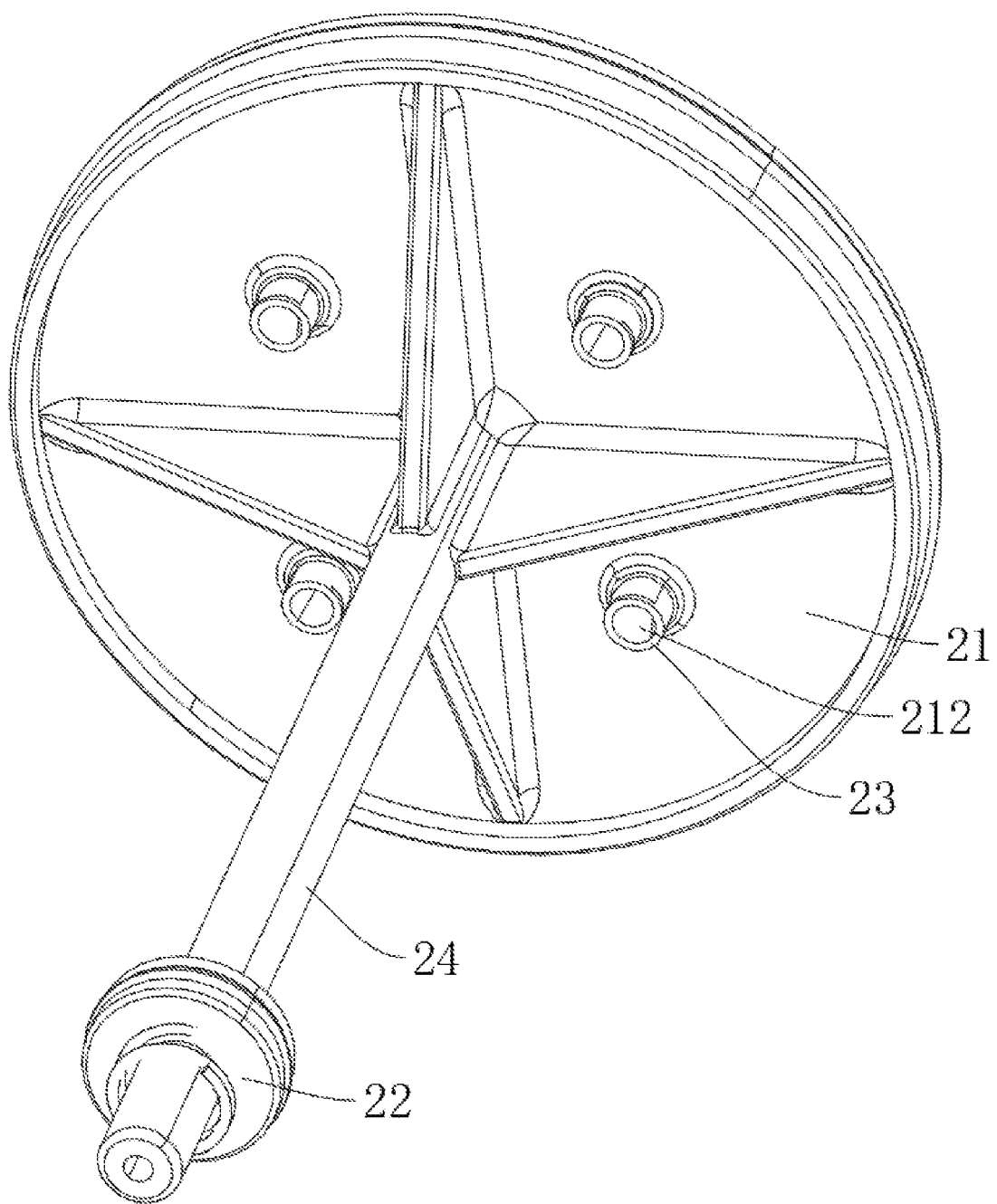
FIG. 10 is a schematic structural diagram of FIG. 8 in another angle.

Referring to FIG. 8 to FIG. 10, in some embodiments, there are a plurality of connecting members 23 on the partition plate 21. The size of each connecting member 23 in a thickness direction of the partition plate 21 is greater than that of the partition plate 21, that is, the connecting member 23 protrudes from a top surface of the partition plate 21 and a bottom surface of the partition plate 21. The water passage 212 is arranged in the connecting member 23, so that the water passage 212 can be designed to be longer to improve the effect of forming water droplets.

Figure 5:
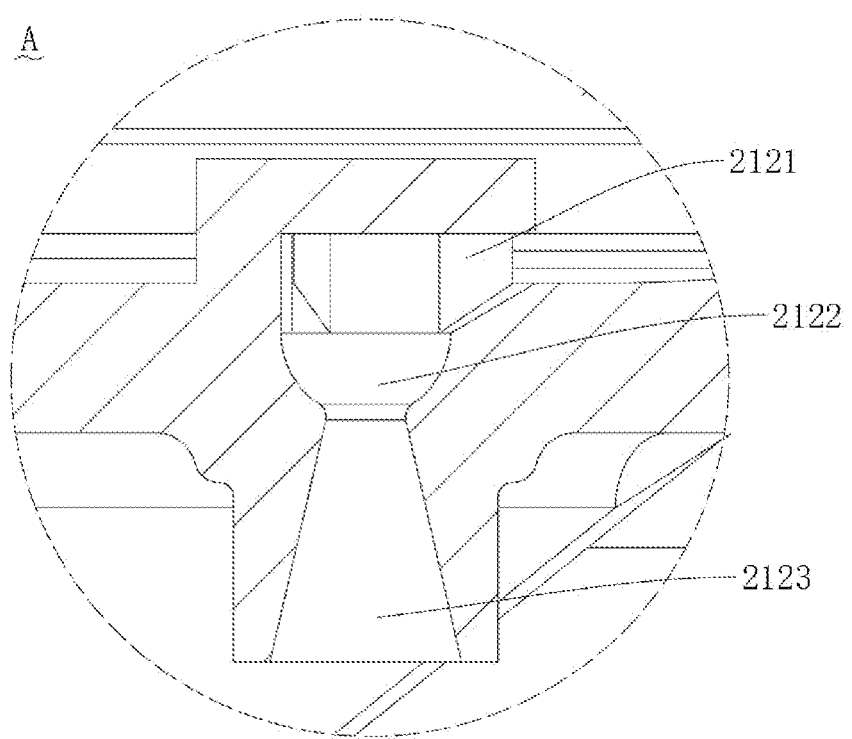
FIG. 5 is a schematic enlarged diagram of region A in FIG. 3.

Referring mainly to FIG. 5, in some embodiments, each water passage 212 includes a first passage 2121, a second passage 2122, and a third passage 2123 which are communicated in turn. A water inlet end of the first passage 2121 is communicated with the first chamber 16, and a water outlet end of the first passage 2121 is communicated with a water inlet end of the second passage 2122. There are a plurality of first passages 2121 arranged around the second passage 2122. The water outlet end of the second passage 2122 is communicated with a water inlet end of the third passage 2123, and a flowing cross-sectional area from the water inlet end of the second passage 2122 to the water outlet end gradually decreases. A water outlet end of the third passage 2123 is communicated with the second chamber 17, and a flowing cross-sectional area from the water inlet end of the third passage 2123 to the water outlet end gradually increases.

When the water enters the first passage 2121, since the first passage 2121 is small, the flow velocity of the water flow is accelerated, which makes the pressure of air around it low, and the surrounding air will flow around the water flow. The water has surface tension, so that when air enters a water surface, the water surface becomes concave. Because of the formation of the concave shape, the air then enters the water flow to form bubbles.

When the water in the plurality of first passages 2121 flows into the second passage 2122, multiple water flows generate impact and generate vibrations, and then water droplets are generated in the water flow in the second passage 2122. In addition, the flowing cross-sectional area from the water inlet end to the water outlet end of the second passage 2122 gradually decreases, which also accelerates the flowing of the water. In some embodiments, the second passage 2122 is hemispherical, which is conducive to generating turbulence by the multiple water flows in the hemispherical second passage 2122 to improve the vibration effect.

When the water in the second passage 2122 flows into the third passage 2123, the flowing cross-sectional area from the water inlet end to the water outlet end of the third passage 2123 gradually increases. The pressure can be gradually relieved when the water flows through the third passage 2123, so that innumerable water droplets in the water flow are formed and diffused, and are dispersed into the second chamber 17 to enlarge the contact area with the air in the second chamber 17 and improve the air dissolution efficiency.

In some embodiments, the first passage 2121 is arranged slantways to further accelerate the flowing of the water in the first passage 2121, which is convenient for more air to enter the water flow to generate bubbles, thus improving the vibration effect of the water flow in the second passage 2122 and increasing the number of water droplets.

Refer to FIG. 3 and FIG. 4, in some embodiments, the uppermost first reinforcing rib 115 located on the inner circumferential wall of the barrel body 11 acts as a limiting rib. When the partition plate 21 moves up and down, the partition plate 21 is respectively abutted against the barrel cover 12 and the limiting rib, that is, the limiting rib limits the partition plate 21 to move between an inner end surface of the barrel main body 1 and the limiting rib, thus preventing the partition plate 21 from sinking and ensuring the volume of the second chamber 17.

In some embodiments, the outer circumferential wall of the partition plate 21 is provided with a second sealing ring 42, and the second sealing ring 42 is located between the outer circumferential wall of the partition plate 21 and the inner circumferential wall of the barrel body 11 to ensure the sealing performance of the first chamber 16 and the second chamber 17.

The sealing rib 22 opens and closes the connecting port 112 along with the motion of the exciter 2. When the scaling rib 22 moves up, the connecting port 112 is opened, so that the water in the barrel main body 1 can be discharged to the outside, or external air can enter the inner space of the barrel main body 1 through the connecting port 112. When the sealing rib 22 moves down, the connecting port 112 is closed, and the water in the barrel main body 1 only flows from the water outlet 111 to the water utilization terminal.

In some embodiments, the exciter 2 also includes a guide rod 24. The guide rod 24 extends vertically and can be move up and down through the guide hole 151 arranged on the supporting plate 15. The guide rod 24 and the guide hole 151 cooperate to guide the motion of the exciter 2.

In some embodiments, the sealing rib 22 is annular, and is annularly connected to the guide rod 24. The sealing rib 22 can move up out of the connecting pipe section 13 to open the connecting port 112. Or, the sealing rib 22 can move down into the connecting pipe section 13 to close the connecting port 112, and can also close a clearance between the guide rod 24 and the guide hole 151 when closing the connecting port 112.

In some embodiments, a third sealing ring 43 is annularly arranged on an outer circumferential wall of the sealing rib 22. When the sealing rib 22 can move down into the connecting pipe section 13 to close the connecting port 112, the third sealing ring 43 is located between the outer circumferential wall of the sealing rib 22 and the inner circumferential wall of the connecting pipe section 13 to improve the sealing performance.

Refer to FIG. 2 to FIG. 4, the elastic body 3 is arranged in the barrel body 11. The elastic body 3 acts on the exciter 2 and drives the exciter 2 to move up to open the connecting port 112.

In some embodiments, the elastic body 3 is a spring which sleeves the guide rod 24 to limit and guide the deformation of the spring with the guide rod 24. The elastic body 3 is positioned between the support plate 15 and the scaling rib 22 to drive the sealing rib 22 to move up to open the connecting port 112.

As shown in FIG. 4, when water enters the first chamber 16 from the water inlet 121, an impact force of the water on the partition plate 21 can drive the exciter 2 to overcome the elastic force of the elastic body 3 to move down, so that the sealing rib 22 closes the connecting port 112. The water continues to pass through the water passage 212 on the partition plate 21 to form numerous water droplets and enter the second chamber 17. After the water and the air are mixed, the mixture is supplied to the water utilization terminal through the water outlet 111.

Referring to FIG. 3, when the water inlet 121 stops supplying water, the elastic force of the elastic body 3 causes the exciter 2 to automatically move up to open the connecting port 112. Thus, the water in the barrel main body 1 can flow out through the connecting port 112, and the external air can also enter the barrel main body 1 through the connecting port 112 to fully fill the barrel main body 1 again, so that there is enough air dissolved in the water during use. According to the container, the impact force of the water flow and the elastic force of the elastic body 3 are ingeniously used, thus automatically opening and closing the connecting port 112. The structure of the microbubble generation container is simplified, and the microbubble generation container can adapt to more application scenarios.

It is worth mentioning that in the process that the impact force of the water on the partition plate 21 drives the exciter 2 to move down against the elastic force of the elastic body 3, that is, when the connecting port 112 is not closed, although a small amount of water flows into the second chamber 17 from the water passage 212, the water will flow to the water utilization terminal only from the water outlet 111 on the basis of the design of a height difference between the connecting port 112 and the water outlet 111, thus avoiding a waste of the water flowing out of the connecting port 112.

In some embodiments, a flow rate of the water inlet 121 is greater than a total flow rate of the plurality of water passages 212, which makes a water level in the first chamber 16 continuously rise to compress the air in the first chamber 16. The increase of the pressure of the first chamber 16 and the impact force of the water drive the exciter 2 to move down to close the connecting port 112.

Figure 11:
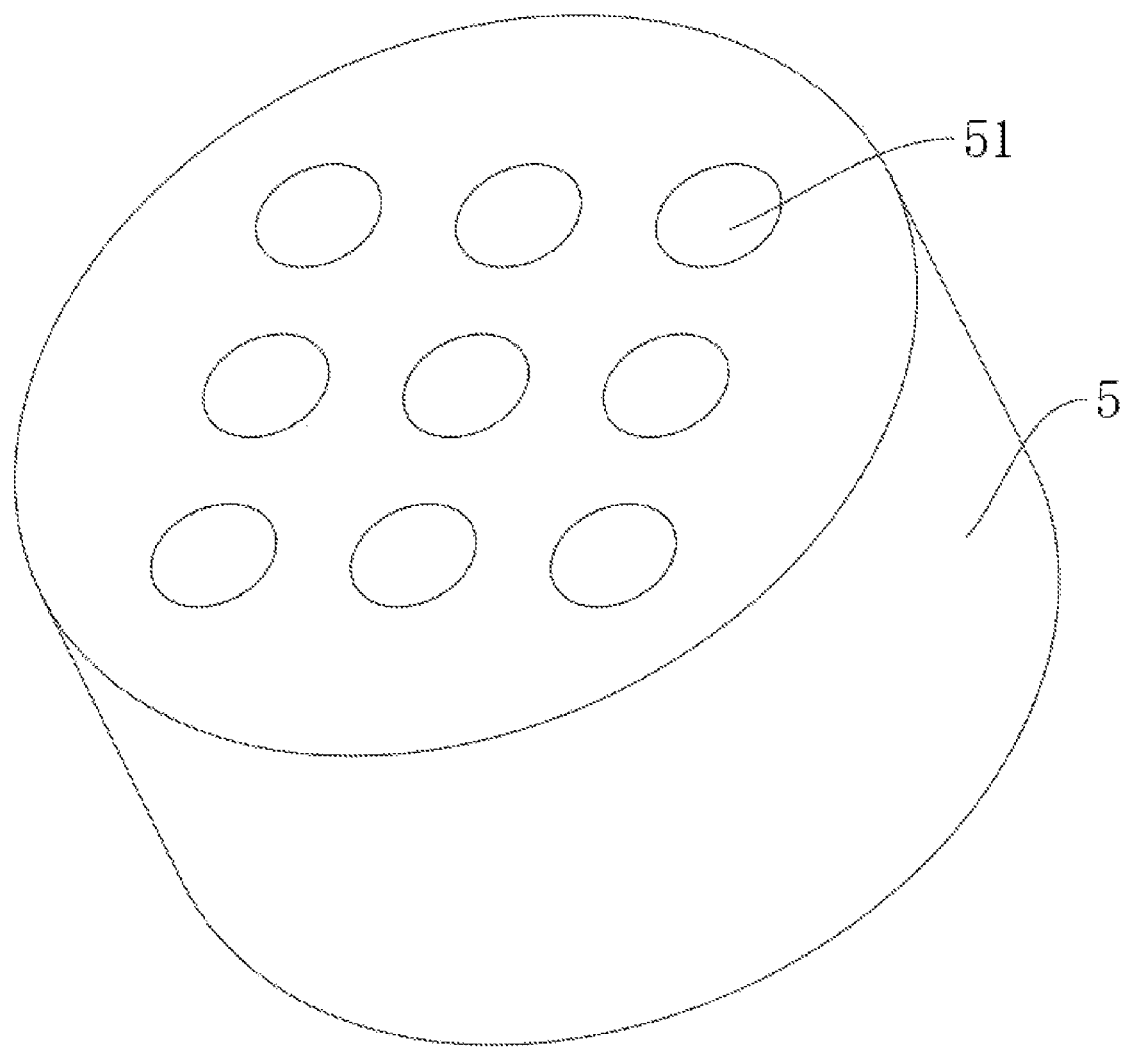
FIG. 11 is a schematic structural diagram of a dissolved air release body.
Figure 12:
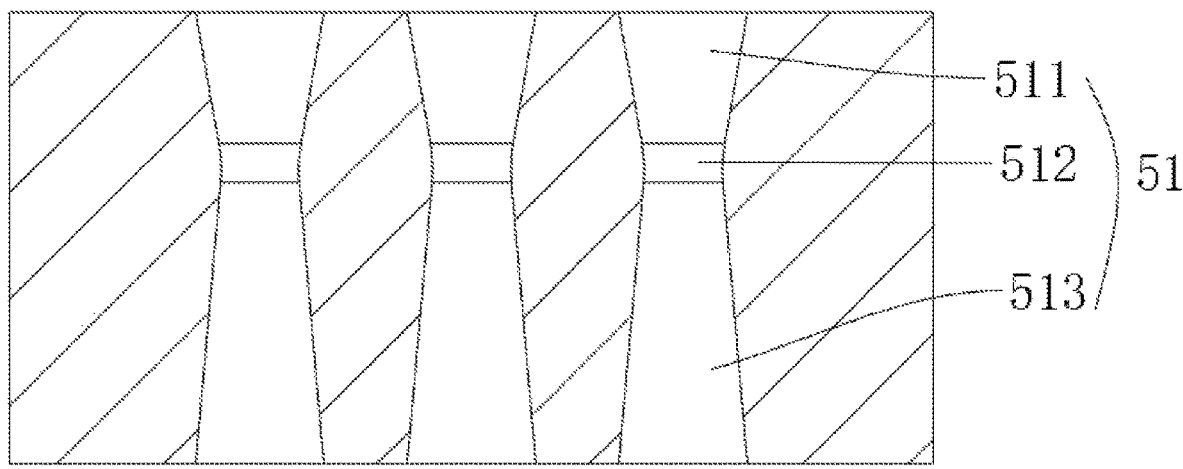
FIG. 12 is a schematic structural diagram of FIG. 11 in another angle.

Referring to FIG. 11 and FIG. 12 and in combination with FIG. 1, the present disclosure further provides a water discharging device based on the microbubble generation container. The water discharging device includes the microbubble generation container in any of the above embodiments, and further includes a dissolved air release body 5 and a water utilization terminal.

The dissolved air release body 5 releases air dissolved in water in the container to form microbubble water with extremely small bubbles for delivery at the water utilization terminal, which greatly improves the cleaning ability.

The water outlet 111 of the microbubble generation container is used for supplying water to the water utilization terminal, and the water inflow of the water inlet 121 is greater than the water outflow of the water utilization terminal, which makes a water level in the second chamber 17 continuously rise to compress the air in the second chamber 17, and the pressure of the second chamber 17 increases to form a high-pressure chamber. The air dissolution efficiency of the air in a high-pressure state is higher than that in a low-pressure state. At this time, more air can be dissolved in the water of the second chamber 17 and flows to the water utilization terminal from the water outlet 111.

It should be noted that the dissolved air release body 5 can be arranged in the barrel main body 1 of the microbubble generation container and located at the water outlet 111. The dissolved air release body 5 can also be arranged in a connection pipeline between the microbubble generation container and the water utilization terminal. The dissolved air release body 5 can also be arranged in the water utilization terminal, which is not limited here.

In some embodiments, the dissolved air release body 5 is internally provided with a plurality of flow guide passages 51. Each flow guide passage 51 includes a pressurization section 511, a throat section 512, and a pressure relief section 513 which are communicated in turn. A flowing cross-sectional area from a water inlet end to a water outlet end of the pressurization section 511 gradually decreases. A flowing cross-sectional area from a water inlet end to a water outlet end of the throat section 512 is roughly equal. A flowing cross-sectional area from a water inlet end to a water outlet end of the pressure relief section 513 gradually increases.

Water mixed with air is delivered to the dissolved air release body 5, so that the water is pressurized through the pressurization section 511, and the pressure reaches the maximum at the throat section 512. The water then flows into the pressure relief section 513. At this time, the water pressure decreases, and the air dissolved in the water is released, thus forming microbubble water with extremely small bubbles used in the water utilization terminal to improve the cleaning ability.

It should be noted that since the flowing cross-sectional area of the flow guide passage 51 in the dissolved air release body 5 is smaller than that of the water inlet 121, the water inflow of the water inlet 121 is greater than the water outflow of the water outlet 111. When the water level in the barrel main body 1 rises to compress the air in the barrel main body 1, high pressures are generated in the first chamber 16 and the second chamber 17. The high pressure generated in the first chamber 16 can cooperate with the impact force of the water entering the first chamber 16 from the water inlet 121 to jointly promote the exciter 2 to move. The high pressure generated in the second chamber 17 can improve the air dissolution efficiency. In some other embodiments, the flowing cross-sectional area of the water outlet 111 can also be smaller than that of the water inlet 121, so that the water inflow of the water inlet 121 is greater than the water outflow of the water outlet 111, and high pressures are generated in the first chamber 16 and the second chamber 17.

Based on the design that simplifies the structure of the microbubble generation container, the microbubble generation container can be used in more scenarios. For example, the water utilization terminal can be a washbasin faucet, a kitchen faucet, a shower head, a top sprayer, etc., and the microbubble water can flow out of the water utilization terminal for use through the microbubble generation container and the dissolved air release body 5.

Based on the above technical solutions, the embodiments of the present disclosure at least have the following advantages and beneficial effects:

In the microbubble generation container of the embodiments of the present disclosure, when water enters the first chamber 16 from the water inlet 121, an impact force of the water on the partition plate 21 is greater than the elastic force of the elastic body 3 and can drive the exciter 2 to overcome an elastic force of the elastic body 3 to move, so that the sealing rib 22 closes the connecting port 112. When the water passes through the water passage 212, water droplets are formed and enter the second chamber 17. The formation of the water droplets can enlarge the contact area between the water and air in the second chamber 17, thereby improving the air dissolution efficiency. After the water is mixed with the air, the mixture flows out from the water outlet 111 to the water utilization terminal for use.

When water supplying is stopped at the water inlet 121, the elastic body 3 acts on the exciter 2, so that the exciter 2 automatically reversely moves to open the connecting port 112, and the water in the barrel main body 1 can outwards flow through the connecting port 112. Meanwhile, external air can also enter the barrel main body 1 through the connecting port 112 to fully fill the barrel main body 1 again, so that there is enough air dissolved in the water during next use. According to the container, the impact force of the water flow and the elastic force of the elastic body 3 are ingeniously used, thus automatically opening and closing the connecting port 112. The structure of the microbubble generation container is simplified, and the microbubble generation container can adapt to more application scenarios.

Although the present disclosure has been described with reference to a few typical embodiments, it should be understood that the terms used are illustrative and exemplary rather than restrictive. Since the present disclosure can be implemented in various forms without departing from the spirit or essence of the present disclosure, it should be understood that the above-mentioned embodiments are not limited to any of the foregoing details, but should be interpreted broadly within the spirit and scope defined by the appended claims. Therefore, all changes and modifications falling within the scope of the claims or their equivalents shall be covered by the appended claims.

What is claimed is:

1. A microbubble generation container, comprising a barrel main body, an exciter and a spring, wherein
the barrel main body is provided with a water inlet, a water outlet, a guide hole and a connecting port;
the exciter is movably arranged in the barrel main body, and comprises:
a partition plate configured to divide an inner space of the barrel main body into a first chamber and a second chamber, wherein the water inlet is communicated to the first chamber; the water outlet and the connecting port are both communicated to the second chamber; the partition plate is provided with a water passage for communicating the first chamber with the second chamber, wherein the water passage enables water flowing by to form water droplets and be ejected;
a guide rod extending from a surface, facing the connecting port and the guide hole, of the partition plate, wherein one end of the guide rod is movably arranged in the guide hole; and
an annular sealing rib protruded from a sidewall of the guide rod, wherein the sealing rib is configured to open and close the connecting port with a motion of the guide rod;
the spring is configured to act on the exciter to drive the exciter to move towards the water inlet, so as to remove the sealing rib from the connecting port to open the connecting port;
wherein the exciter is driven to move towards the connecting port under an impact force of water entering the first chamber from the water inlet on the partition plate when the impact force overcomes an elastic force of the spring, so as to make the sealing rib be able to close the connecting port.

2. The microbubble generation container according to claim 1, wherein the guide rod is movably arranged in the guide hole in a penetrating manner.

3. The microbubble generation container according to claim 1, wherein the sealing rib is configured to cooperate with the guide rod to close the connecting port.

4. The microbubble generation container according to claim 3, wherein the barrel main body further comprises a connecting pipe section and a supporting plate;
one end of the connecting pipe section is communicated with the second chamber, and the connecting port is formed in the one end of the connecting pipe section; an other end of the connecting pipe section is communicated to the outside of the barrel main body;
the supporting plate is connected to the inside of the connecting pipe section and is away from the connecting port;
the supporting plate is provided with the guide hole and a plurality of through holes; wherein the sealing rib is configured to move into the connecting pipe section to close the connecting port, or move out of the connecting pipe section to open the connecting port.

5. The microbubble generation container according to claim 4, wherein one end of the connecting pipe section communicated to the barrel main body extends into the barrel main body, to make a height difference between the connecting port and the water outlet.

6. The microbubble generation container according to claim 4, wherein the spring sleeves the guide rod and is located between the supporting plate and the sealing rib.

7. The microbubble generation container according to claim 4, wherein the exciter further comprises a sealing ring annularly arranged on an outer circumferential wall of the sealing rib; wherein when the sealing rib moves into the connecting pipe section to close the connecting port, the sealing ring is located between the outer circumferential wall of the sealing rib and the inner circumferential wall of the connecting pipe section to improve the sealing performance.

8. The microbubble generation container according to claim 1, wherein a flow rate of the water inlet is greater than that of the water passage.

9. The microbubble generation container according to claim 1, wherein a limiting rib is arranged on one end, close to the water inlet, of an inner circumferential wall of the barrel main body; and the limiting rib is configured to limit the partition plate to move between an end surface of the barrel main body and the limiting rib.

10. The microbubble generation container according to claim 1, wherein the water passage comprises a first passage, a second passage, and a third passage which are communicated in sequence;
a plurality of first passages are arranged around the second passage;
a flowing cross-sectional area from one end of the second passage communicated to the first passage to one end communicated to the third passage gradually decreases; and
a flowing cross-sectional area from one end of the third passage communicated to the second passage to one end away from the second passage gradually increases.

11. The microbubble generation container according to claim 10, wherein the first passages are slantways arranged.

12. The microbubble generation container according to claim 1, wherein the microbubble generation container further comprises a dissolved air release body arranged in the barrel main body and located at the water outlet; wherein the dissolved air release body is internally provided with a plurality of flow guide passages that are configured for releasing air dissolved in water flowing out of the water outlet, so as to generate microbubble water with extremely small bubbles from the water flowing out of the water outlet.

13. The microbubble generation container according to claim 12, wherein each flow guide passage comprises a pressurization section, a throat section, and a pressure relief section which are communicated in turn, wherein a flowing cross-sectional area from a water inlet end to a water outlet end of the pressurization section gradually decreases; a flowing cross-sectional area from a water inlet end to a water outlet end of the throat section is roughly equal, a flowing cross-sectional area from a water inlet end to a water outlet end of the pressure relief section gradually increases; the water inlet end of the pressurization section is configured to receive the water flowing out of the water outlet.

\* \* \* \* \*